United States Patent
Pritchett et al.

(10) Patent No.: US 7,357,890 B2
(45) Date of Patent: Apr. 15, 2008

(54) APPARATUS AND METHOD FOR EXTRUDING A MULTILAYERED STRUCTURE

(75) Inventors: Tim Pritchett, Bethlehem, PA (US); Jennifer Peavey, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 39 days.

(21) Appl. No.: 11/252,381

(22) Filed: Oct. 18, 2005

(65) Prior Publication Data

US 2007/0087069 A1    Apr. 19, 2007

(51) Int. Cl.
B29C 47/64    (2006.01)
B29C 47/06    (2006.01)

(52) U.S. Cl. .................. 264/209.2; 425/133.5; 425/382.3; 425/131.1

(58) Field of Classification Search .............. 425/131.1, 425/133.5, 382.3; 264/209.2
See application file for complete search history.

(56) References Cited

U.S. PATENT DOCUMENTS

| 3,404,203 | A |   | 10/1968 | Donald |
|---|---|---|---|---|
| 3,484,507 | A | * | 12/1969 | Smith ................... 524/69 |
| 3,557,265 | A |   | 1/1971  | Chisholm et al. |
| 3,565,985 | A |   | 2/1971  | Schrenk et al. |
| 3,606,363 | A | * | 9/1971  | Glass et al. ................ 277/354 |
| 3,759,647 | A |   | 9/1973  | Schrenk et al. |
| 3,773,882 | A |   | 11/1973 | Schrenk |
| 3,884,606 | A |   | 5/1975  | Schrenk |
| 3,966,861 | A |   | 6/1976  | Papesh et al. |
| 4,426,344 | A |   | 1/1984  | Dinter et al. |
| 4,435,141 | A |   | 3/1984  | Weisner et al. |
| 4,770,837 | A |   | 9/1988  | Lu et al. |
| 4,834,639 | A | * | 5/1989  | Eschbach et al. ........ 425/131.1 |
| 4,965,135 | A |   | 10/1990 | Im et al. |
| 5,094,793 | A |   | 3/1992  | Schrenk et al. |
| 5,269,995 | A |   | 12/1993 | Ramanathan et al. |
| 6,599,451 | B2 |  | 7/2003  | Franke et al. |
| 6,685,872 | B2 |  | 2/2004  | Dooley et al. |

FOREIGN PATENT DOCUMENTS

WO    WO 00/76765 A1    12/2000

* cited by examiner

*Primary Examiner*—Robert B. Davis
*Assistant Examiner*—Marissa W. Chaet
(74) *Attorney, Agent, or Firm*—Alston & Bird LLP

(57) ABSTRACT

An apparatus and method for extruding a multilayered article employs a shearing rod connected to the end of an extruder screw. The shearing rod is rotated along with the extruder screw and shears the polymer materials being advanced along an annular space between the shearing rod and the inner surface of a bore in a housing. A first melt stream of polymer material is advanced by the extruder screw into the annular space. A second melt stream of polymer material is fed (e.g., from a second extruder) through a passage in the housing into the annular space to join with the first melt stream therein. The rotation of the shearing rod shears the melt streams and swirls them together to produce a multiplicity of layers of the polymer materials.

18 Claims, 5 Drawing Sheets

APPARATUS AND METHOD FOR EXTRUDING A MULTILAYERED STRUCTURE

BACKGROUND OF THE INVENTION

The present invention generally relates to coextrusion of polymer articles from two or more melt streams comprising one or more types of polymers. The invention more particularly relates to coextrusion of polymer articles having a multiplicity of layers or microlayers of the same or different polymer materials.

In the production of articles such as polymer films, it has been recognized that improvements in one or more properties of a polymer article can be achieved by manufacturing the article as a layered structure having two or more layers of the same or different polymer materials. For example, one polymer material may be good in property A but poor in property B, while another polymer material may be weak in property A but may excel in property B. An article formed with layers of both polymer materials can achieve good performance in both properties A and B.

It has also been found that a laminar morphology can be advantageous even when a single type of polymer material makes up the polymer article. Thus, a polymer article can be formed of multiple layers of the same polymer material. Each layer is individually extruded and the layers are combined one atop another. Such a laminar structure can attain properties that an equivalent single-layer structure cannot.

Coextrusion is an advantageous method for producing such layered articles because the various layers are formed substantially simultaneously and interlayer bonding is achieved during the coextrusion of the layers while the polymer materials are still in a molten state. The coextrusion process thus is streamlined and efficient. In a simple "static" coextrusion process, one or more extruders feed one or more melt streams of polymer materials to a static die assembly having two or more die orifices that are adjacently arranged such that a layer extruded through one orifice merges with a layer extruded through an adjacent orifice and the layers bond together while still in the molten state. In more complex static coextrusion processes, the die assembly has multiple passages for splitting melt streams into a plurality of separate streams that are then recombined in a manner dictated by the configuration of the die assembly passages. In any event, the multilayer extrudate may be deformed into a desired configuration, and is then cooled to solidify the layers.

The above-described static coextrusion process typically is used, in one form or another, for production of multilayer articles having a relatively small number of layers, for example, from two to ten layers. Because each layer is produced by a separate die orifice or passage, the layer thickness generally must be relatively large (typically tens of microns at the exit of the die orifice). The splitting and recombining of melt streams require space and time to accomplish. Accordingly, the static coextrusion process is not suitable for producing articles having a large number of very thin layers or "microlayers".

It has been recognized that articles manufactured to have a large number of microlayers can achieve useful properties that statically coextruded articles cannot. The number of layers can range from tens to thousands. By "microlayer" is meant a layer having a thickness in the micron or submicron range. For example, microlayers have been created in the nanometer ($10^{-9}$ m) range and even in the picometer ($10^{-12}$ m) range. Microlayered films have been produced having advantageous oxygen and/or moisture vapor barrier performance, advantageous absorption characteristics, advantageous tear-resistance, and advantageous optical properties, to name just a few examples.

The manufacture of microlayered articles of tubular form conventionally is accomplished through a "dynamic" coextrusion process in which two or more melt streams of the same or different polymer materials are extruded through an annular orifice of a die assembly that has one or more movable components for producing a shearing action of one melt stream relative to another. Typically the die assembly includes an inner member disposed within a bore of an outer member to form an annular passage between them, and the inner and outer members are rotatable relative to each other to shear the polymer stream being advanced along the annular passage. The various melt streams are separately fed into the annular passage and they blend together and are sheared by the rotation of the member(s), thereby producing a multiplicity of layers of the different polymer materials. The blended polymer melt stream is then discharged from an annular exit orifice of the die assembly to produce a tubular article. The rotation of the die member(s) generally is accomplished by a motor coupled through suitable gears or the like to the rotatable member(s). Often these dynamic die assemblies are relatively complex in construction, tend to have reliability problems, and can be prone to leaking.

The manufacture of microlayered articles of flat form conventionally is accomplished though a "static" coextrusion process in which two or more melt streams of the same or different polymer materials are extruded through a slit orifice of a die. Typically the die assembly includes an inner member disposed within the two halves of an outer member to form multiple slit passages between them, and additional inner members increase the number of layers by splitting the stream, stretching the split streams and recombining the split streams into one channel as the layers are being advanced along the slit passage. The various melt streams are separately fed into the slit passages, thereby producing a multiplicity of layers of the same or different polymer materials. The blended polymer melt stream is then discharged from a slit exit orifice of the die assembly to produce a flat article. Often these static die assemblies are relatively complex in construction and are fixed to a certain number of layers per assembly.

BRIEF SUMMARY OF THE INVENTION

The present invention addresses the above needs and achieves other advantages by providing an apparatus and method for extruding a multilayered article in which the apparatus is relatively simple in construction. In one aspect of the invention, no special drive motor and gear arrangement is required, but instead a shearing action for producing microlayers is accomplished by a shearing rod connected to the end of an extruder screw. The shearing rod is rotated along with the extruder screw and shears the polymer materials being advanced along an annular space between the shearing rod and the inner surface of a bore in a housing. A first melt stream of polymer material is advanced by the extruder screw into the annular space. A second melt stream of polymer material, which can be the same material as the first melt stream or a different material, is fed (e.g., from a second extruder) through a passage in the housing into the annular space to join with the first melt stream therein. The rotation of the shearing rod shears the melt streams and swirls them together to produce a multiplicity of layers of the polymer material(s).

In some embodiments of the invention, the second melt stream is fed through a plurality of separate passages into the annular space. For example, the housing can define a plurality of generally radial passages spaced circumferentially about the annular space and leading into the annular space for feeding a plurality of second melt streams into the first melt stream being advanced along the annular space. Alternatively or additionally, the first melt stream can be divided into a plurality of first melt streams for blending with the second melt stream(s).

Advantageously, the shearing action of the polymer material produced by the rotation of the shearing rod is enhanced by narrowing the annular space in the region where the second melt streams lead into the annular space. For example, the shearing rod can include a portion of relatively greater diameter than other portions of the shearing rod so that the annular space between the larger-diameter portion and the inner surface of the housing bore is reduced in flow area. The passage(s) for the second melt stream(s) can lead into the annular space at a location proximate the larger-diameter portion of the shearing rod. Alternatively, the reduction in flow area can be accomplished by a reduction in the diameter of the housing bore at one location, or by a combination of increased rod diameter and reduced bore diameter at one location.

In some embodiments of the invention, the shearing rod has a free end located within the bore of the housing and an end part of the bore extends beyond the free end of the shearing rod. The first and second melt streams are advanced from the annular space into the end part of the bore and fill the end part before being discharged from the end part as a non-hollow cylindrical melt stream for delivery to a subsequent article-forming device. The non-hollow cylindrical melt stream has a multiplicity of layers of the polymer material in alternating arrangement. The end part of the bore can terminate at an outer face of the housing to define a discharge opening through which the non-hollow cylindrical melt stream is discharged. For example, the non-hollow cylindrical melt stream can be delivered to a downstream die assembly configured to extrude an article in a desired shape.

The shearing rod can be connected to the extruder screw in various ways. For instance, the extruder screw and shearing rod can be formed as an integral one-piece construction. Alternatively, the shearing rod can be formed separately from the extruder screw and then attached to the screw by various techniques. The attachment of the shearing rod to the extruder screw can be either permanent (e.g., by welding, brazing, or the like) or detachable and re-attachable (e.g., by a threaded connection or the like).

In another aspect of the invention, the shearing rod need not be connected to an extruder screw but instead can be independently driven by a suitable motor and drive arrangement.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
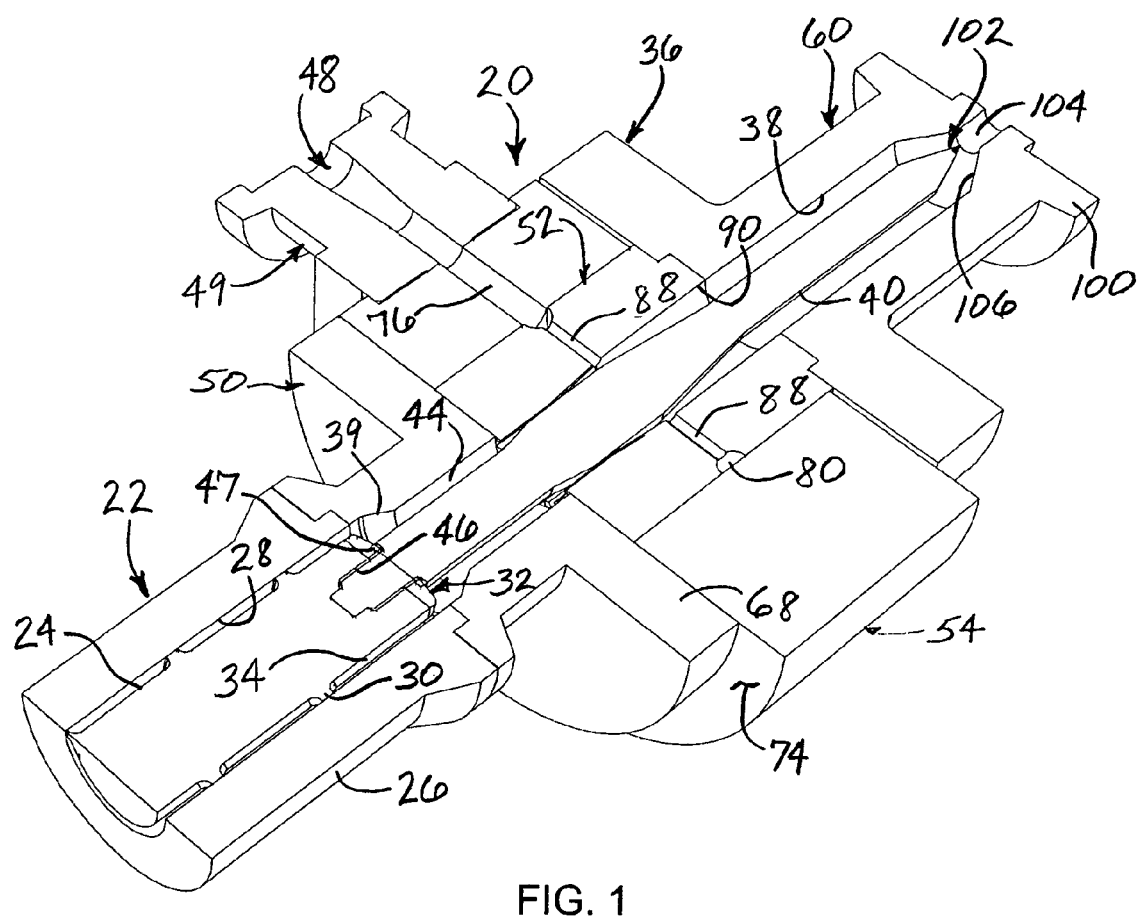
FIG. 1 is an axially sectioned isometric view of an apparatus in accordance with a first embodiment of the invention.
Figure 2:
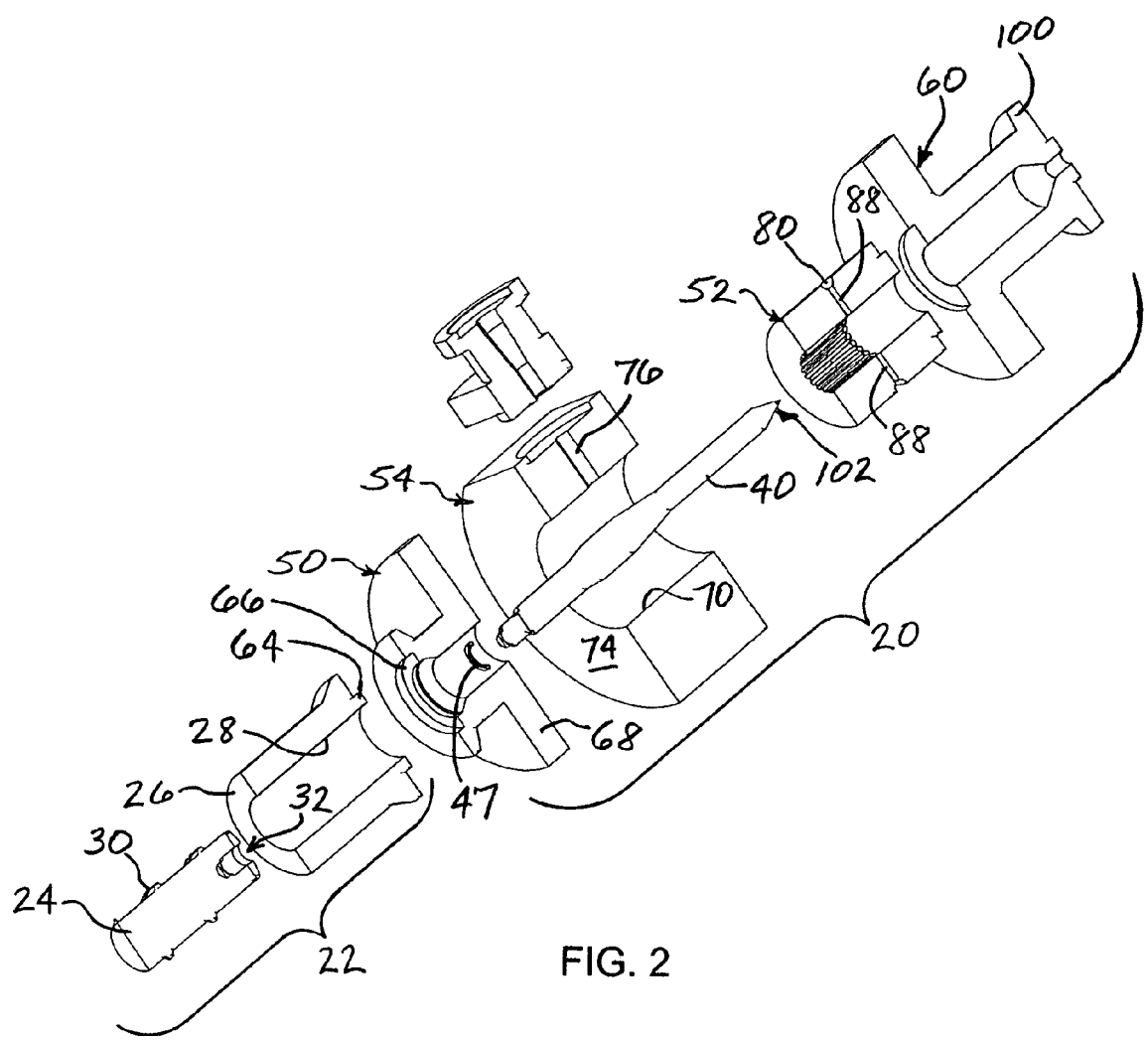
FIG. 2 is an axially sectioned exploded isometric view of the apparatus.
Figure 3:
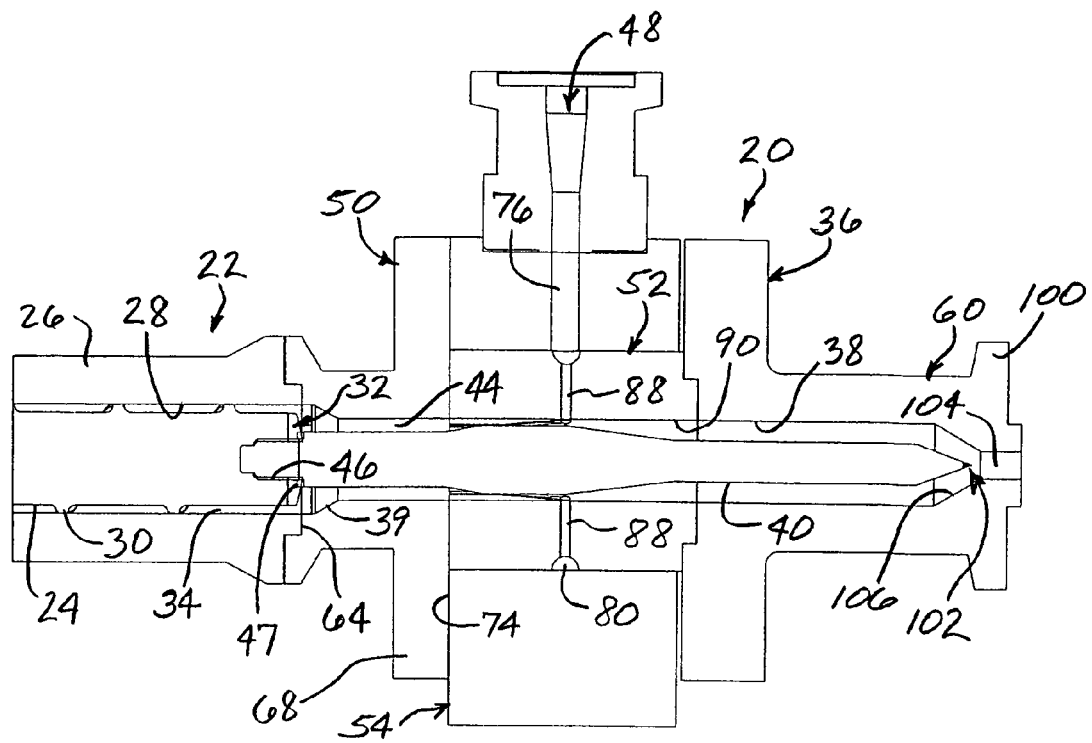
FIG. 3 is an axially sectioned side view of the apparatus.
Figure 4:
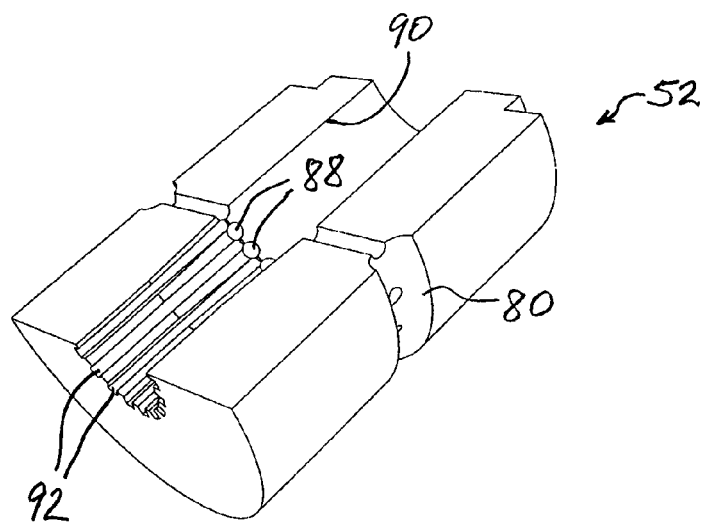
FIG. 4 is an axially sectioned isometric view of a distributor of the apparatus.

With reference to FIGS. 1 through 3, an apparatus 20 in accordance with a first embodiment of the invention is shown assembled with an extruder 22 with which the apparatus 20 is configured to be used. The extruder comprises an extruder screw 24 that is rotatable within a tubular extruder barrel or housing 26. The extruder housing 26 has a cylindrical bore 28 (also referred to herein as a first portion of the bore) extending therethrough. The screw 24 has a helical screw thread 30 projecting from its outer surface and extending helically along a length of the screw. The thread 30 terminates at an end portion 32 of the screw. The end portion 32 of the extruder screw is disposed in the bore 28 of the housing 26 so as to define a first annular space 34 between the outer surface of the extruder screw 24 and an inner surface of the bore 28. The screw thread cooperates with the bore such that rotation of the extruder screw advances a first melt stream of polymer material in a generally helical fashion along the first annular space 34, in a left-to-right direction in FIG. 3.

The apparatus 20 comprises a housing 36 that defines a generally cylindrical bore 38 (also referred to herein as a second portion of the bore) therethrough. The housing 36 is made up of several separately formed members that are joined together to form the housing, as further described below. The housing 36 is structured and arranged to be connected to the extruder housing 26 of the extruder so that the bore 28 (or first bore portion) of the extruder housing is coaxial with and connected with the bore 38 (or second bore portion) of the apparatus housing 36. A tapered bore portion 39 defined by the housing 36 provides a transition between the relatively larger-diameter bore 28 and the relatively smaller-diameter bore 38. Accordingly, a first melt stream of polymer material advancing along the annular space 34 in the extruder 22 is advanced into the bore 38 of the apparatus 20, as further described below.

The apparatus 20 includes a shearing rod 40 disposed coaxially in the bore 38 (and coaxially with the extruder screw 24) such that a second annular space 44 is defined between the outer surface of the shearing rod and the inner surface of the bore 38. The second annular space 44 is connected with the first annular space 34 of the extruder. Thus, the first melt stream of polymer material advanced along the first annular space 34 is delivered into and advanced along the second annular space 44 by the extruder screw 24. The shearing rod 40 is connected at its upstream end to the end portion 32 of the extruder screw 24, such that the shearing rod is rotated along with the screw about their common axis. The connection of the shearing rod 40 to the extruder screw 24 can be accomplished in various ways. For instance, the extruder screw and shearing rod can be formed as an integral one-piece construction. Preferably, however, the shearing rod can be formed separately from the extruder screw and then attached to the screw by various techniques. The attachment of the shearing rod to the extruder screw can be permanent (e.g., by welding, brazing, or the like), but preferably the shearing rod is detachable and re-attachable. Thus, in the illustrated embodiment of FIGS. 1-3, the shearing rod 40 is formed separately from the screw 24 and a threaded connection 46 or the like is employed to couple the shearing rod to the screw in detachable and re-attachable fashion. A sealing ring 47 seals the connection between the screw and the shearing rod. This facilitates the apparatus 20 to be formed separately from the extruder 22 and to be detachable from and re-attachable to the extruder.

Rotation of the shearing rod 40 within the bore 38 of the apparatus 20 causes the polymer material in the second annular space 44 to be sheared so that it advances in a generally helical or screw fashion along the second annular space. The housing 36 of the apparatus 20 also defines a passage 48 through which a second melt stream of polymer material is advanced (e.g., from a second extruder, not shown) for mixing with the first melt stream in the second annular space 44. The apparatus 20 can include an extruder adapter 49 that connects with the housing and facilitates a connection between a second extruder and the apparatus 20. Further details of a preferred embodiment of the housing 36 are now described below with reference to FIGS. 1-4.

As noted, the housing 36 is composed of a number of separate members that are joined together to define the housing. More particularly, the housing 36 comprises an extruder connector 50, a distributor 52, a distributor housing 54, and a feed block connector 60. Each of the members 50, 52, and 60 defines a bore therethrough, and when the members are joined together to form the housing, the various bores in the members collectively form the bore 38 through the housing. The extruder connector 50 is configured to connect with the extruder housing 26 of the extruder 22. To this end, the extruder housing 26 at its upstream end includes an annular axially extending ring 64 that is coaxial with the bore 38 and projects from a downstream-facing surface of the extruder housing and is configured to engage a complementarily shaped groove 66 (FIG. 3) in an upstream-facing surface of the extruder connector 50, the ring 64 being coaxial with the bore 28 in the extruder housing. The upstream-facing surface of the extruder connector 50 that abuts the downstream-facing surface of the extruder housing 26 is perpendicular to the axis of the bore 38. Likewise, the downstream-facing surface of the extruder housing 26 is perpendicular to the axis of the bore 28. Thus, abutting of the corresponding faces of the extruder housing and the extruder connector and engagement of the ring 64 with the groove 66 ensure that the bores 28 and 38 are coaxially aligned. The extruder connector 50 can be affixed to the extruder housing 26 by suitable fasteners, such as screws engaged in holes (not shown) in the members, or alternatively can be affixed by a clamp (not shown).

The extruder connector 50 at its downstream end includes a flange 68 for connecting the extruder connector to the distributor housing 54; the connection can be made by suitable fasteners, such as screws (not shown) engaged in holes in the members, or by a clamp (not shown). The distributor housing 54 defines a central generally cylindrical bore 70 for receiving the distributor 52. The distributor 52 is disposed in the central bore 70 of the distributor housing 54. The upstream face of the distributor 52 is flush with the upstream face 74 of the distributor housing 54, and these faces abut a downstream face of the extruder connector 50.

The passage 48 for the second melt stream is defined in part by the distributor housing 54 and in part by the distributor 52. More specifically, a passage 76 is formed through a laterally outer face of the distributor housing 54 in a generally radially inward direction with respect to the bore 38. A radially inner end of the passage 76 opens into the central bore 70 of the distributor housing and connects with a manifold 80 formed as a groove or channel in the radially outer peripheral surface of the distributor 52, the manifold 80 extending 360° about the circumference of the distributor 52.

The distributor manifold 80 connects with a plurality of separate circumferentially spaced, radially extending passages 88 that lead from the manifold 80 into the central bore 90 of the distributor 52, which bore 90 forms a portion of the bore 38. A second melt stream of polymer material that is fed through the passage 76 in the distributor housing flows into the manifold 80 and flows circumferentially about the manifold 80 to fill it, and then flows from the manifold through the passages 88 into the second annular space 44. Accordingly, a plurality of separate circumferentially spaced melt streams of polymer material are fed into the second annular space 44 to blend with the first melt stream of polymer material being advanced therethrough. The distributor 52 also defines a plurality of axially extending, circumferentially spaced grooves 92 (FIG. 4) in an upstream portion of the inner surface of the bore 90, and the grooves 92 extend downstream to the radial passages 88. The grooves 92 and the passages 88 are interleaved in the circumferential direction, such that each groove 92 is circumferentially between two passages 88. The grooves 92 create a plurality of separate first melt streams of the polymer material advanced from the extruder 22. Thus, the first melt streams in the grooves 92 alternate with the second melt streams fed in through the passages 88, which facilitates the creation of alternating microlayers under the shearing action of the rod 40.

The first and second melt streams advancing through the second annular space 44 are sheared by the rotation of the shearing rod 40 and are therefore swirled together as they advance toward the discharge end of the apparatus 20. This swirling action creates a multiplicity of alternating layers or microlayers of the polymer materials in the advancing annular melt stream. As best seen in FIG. 3, the second melt streams advantageously are fed into the second annular space 44 at a location where the annular space has a minimum flow area. In the illustrated embodiment, this reduction in flow area is accomplished by enlarging a portion of the shearing rod 40; alternatively, however, the bore 38 could be reduced in diameter at one location, or a combination of enlarged shearing rod and reduced bore could be employed. The reduced flow area increases the amount of shearing produced by the shearing rod so as to more-effectively create the microlayers of the polymer materials.

From the point at which the second melt streams join the first melt stream, the swirled annular melt stream is advanced along the portion of the second annular space 44 defined between the shearing rod 40 and the central bore 90 of the distributor 52, then through the portion of the annular space defined between the rod and the central bore of the feed block connector 60. The feed block connector 60 has a downstream flange 100 to facilitate affixing the connector to a subsequent article-forming device such as a die assembly (not shown) that can receive the swirled melt stream from the apparatus 20 and form the melt stream into a desired article such as a film tube, a film sheet, etc.

The shearing rod 40 extends for most of the length of the feed block connector 60 but terminates at a free end 102 of the rod located within the bore 38. Accordingly, and end part 104 of the bore 38 extends beyond the free end 102 of the shearing rod. The free end 102 of the shearing rod can be tapered as shown, and the bore 38 can correspondingly include a tapered portion 106 leading into the end part 104 of the bore. The polymer material thus fills the end part 104 of the bore and is discharged from the end part 104 as a non-hollow cylindrical melt stream having a multiplicity of microlayers, for delivery to a subsequent article-forming device.

Figure 5:
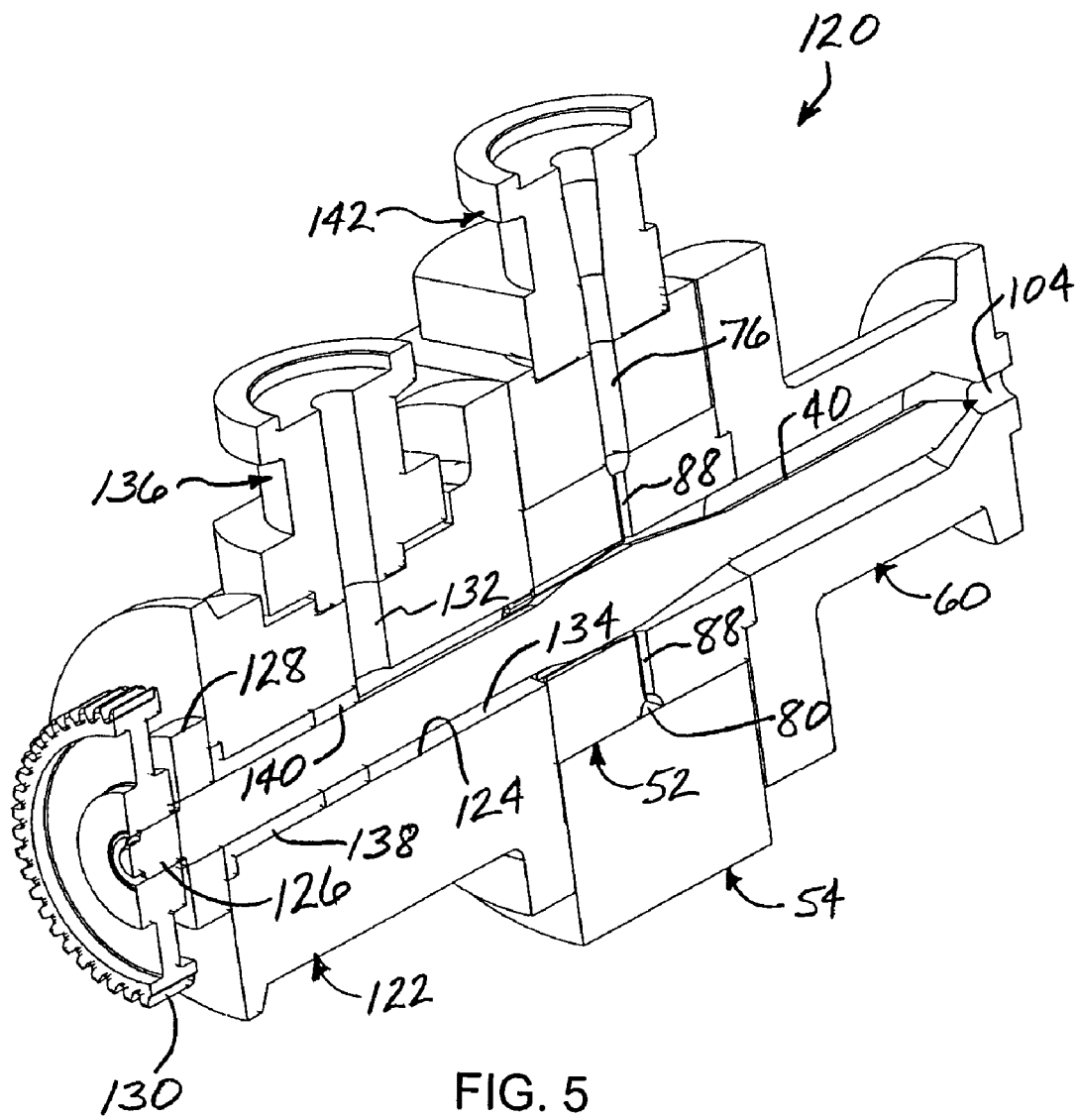
FIG. 5 is an axially sectioned isometric view of an apparatus in accordance with a second embodiment of the invention.
Figure 6:
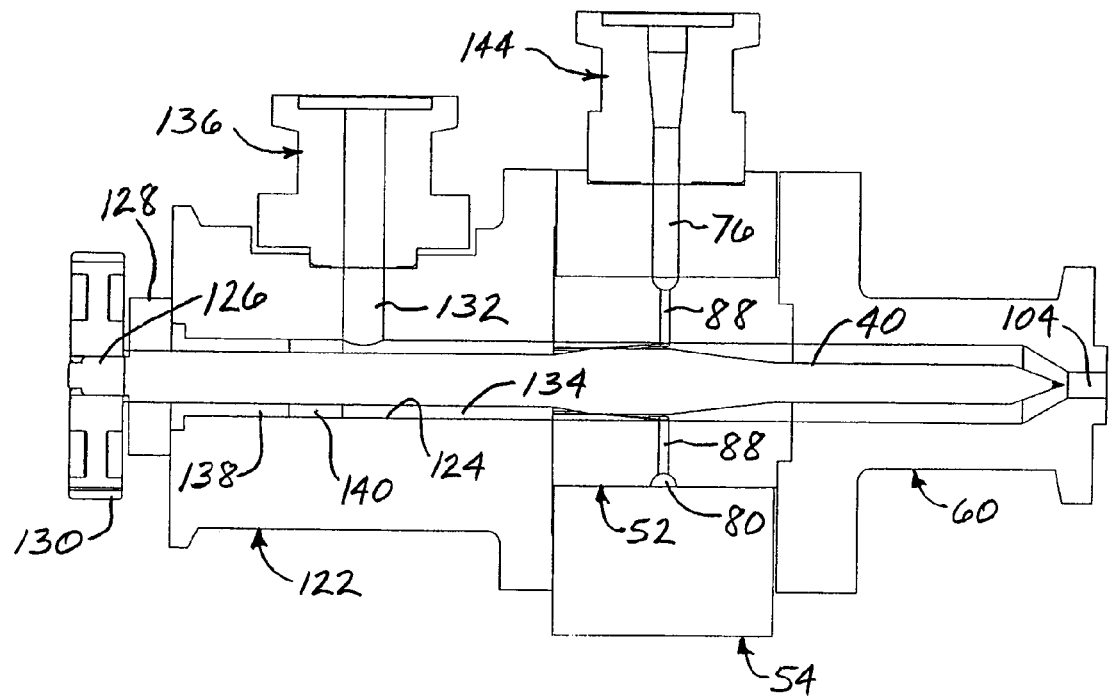
FIG. 6 is an axially sectioned side view of the apparatus of FIG. 5.

A second embodiment of the invention is depicted in FIGS. 5 and 6. The apparatus 120 illustrated in these figures is generally similar in many respects to the apparatus 20 described above. The distributor 52, distributor housing 54, and feed block connector 60 are substantially as described above. Accordingly, the present description focuses upon the significant differences. The primary difference between the apparatus 120 and the previously described embodiment is that the apparatus 120 employs an independent drive arrangement for rotating the shearing rod 40 rather than driving the rod with an extruder screw. A housing member 122 is connected to the upstream end of the distributor housing 54. The housing member 122 defines a generally cylindrical bore 124 therethrough. The shearing rod 40 extends through the bore 124 and an upstream end 126 of the rod projects out from the bore 124 at the upstream end of the housing member. The end 126 of the rod is supported by a bearing 128 affixed to the housing member 122. A gear 130 is affixed to the end of the rod such that the rod is rotated when the gear is rotated. The gear can be engaged by a drive gear (not shown) that is rotatably driven by a suitable motor (not shown).

A first melt stream is fed by a first extruder (not shown) through a passage 132 that leads through the housing member 122 into an annular space 134 defined between the inner surface of the bore 124 and the outer surface of the shearing rod 40. The apparatus 120 can include a first extruder adapter 136 that connects with the housing member 122 and facilitates a connection between the first extruder and the apparatus 120. The upstream end of the bore 124 in the housing member 122 includes an annular bushing 138 and an annular seal 140 through which the rod 40 extends. The bushing 138 fixes the rod in a coaxial relationship with respect to the bore 124 while allowing the rod to rotate therein. The seal 140 is located just upstream of the passage 132 for the first melt stream and serves to seal off the upstream end of the annular space 134 so that the polymer material is substantially prevented from flowing in the upstream direction.

A second extruder (not shown) supplying a second melt stream of polymer material is connected to the distributor housing 54, such as by a second extruder adapter 142, for feeding the second melt stream into the passage 76. As in the prior embodiment, the second melt stream then flows into the manifold 80 defined by the distributor 52, and then through the radial passages 88 into the annular space 44 to join with the first melt stream being advanced therethrough, and the swirled polymer materials are discharged from the end part 104 of the bore 38 as a non-hollow cylindrical melt stream having a multiplicity of microlayers.

The independent driving of the shearing rod 40 in the apparatus 120 allows the shearing rod's rotational speed to be independent of the rotational speed of the extruder screws. This affords a greater amount of freedom in regulating the shearing action of the melt streams.

Figure 7:
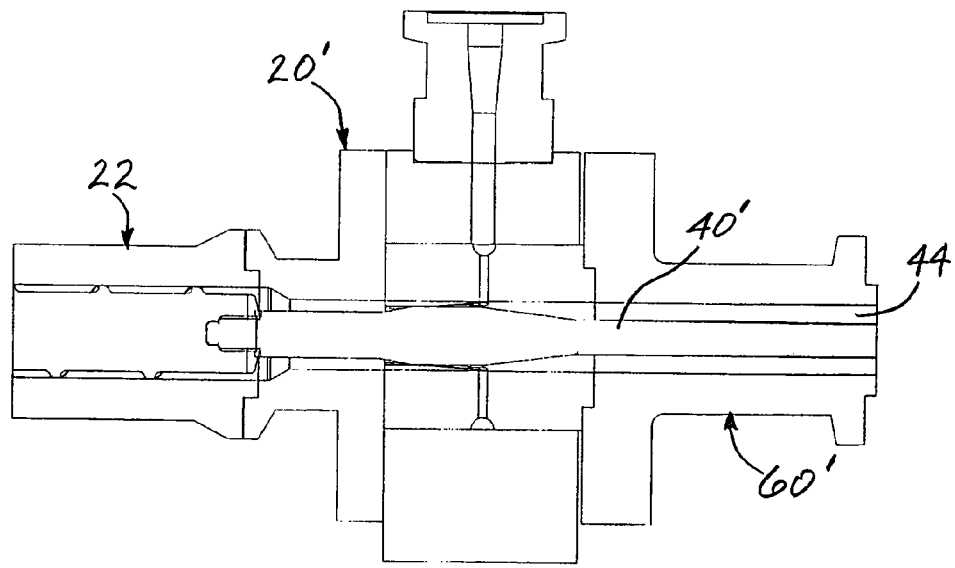
FIG. 7 is an axially sectioned side view of an apparatus in accordance with a third embodiment of the invention.

A third embodiment of the invention is depicted in FIG. 7. An apparatus 20' is shown connected to an extruder 22 as in the first embodiment above. The apparatus is generally similar to the apparatus 20 of FIGS. 1-4, and identical features are not described again here. The apparatus includes a shearing rod 40' that is generally similar to the rod 40 of the first embodiment, except that the rod does not include a tapered tip. The apparatus 20' includes a feed block connector 60' that is generally similar to the feed block connector 60 of the first embodiment, except that the bore therein does not include a tapered portion, but rather the bore is a constant diameter all the way to its end. The end of the shearing rod 40 is flush with the outer face of the feed block connector at which the bore terminates. Accordingly, the melt stream in the annular space 44 is discharged from the apparatus as a hollow cylindrical or tubular melt stream.

Many modifications and other embodiments of the inventions set forth herein will come to mind to one skilled in the art to which these inventions pertain having the benefit of the teachings presented in the foregoing descriptions and the associated drawings. For example, while the described embodiments discharge a non-hollow cylindrical melt stream or a hollow cylindrical (i.e., tubular) melt stream, alternatively the melt stream could be discharged as a flat sheet or in other forms. Additionally, in the embodiment of FIGS. 5 and 6, a portion of the shearing rod 40 upstream of the distributor 52 could have a helical thread for assisting in advancing the polymer melt stream along the annular space, if desired. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for extruding a multilayered structure, comprising:
    a housing defining a bore extending along an axis through the housing, the bore having a first portion positioned upstream with respect to an extrusion direction and a second portion positioned downstream of the first portion with respect to the extrusion direction;
    an extruder screw comprising an outer surface and having a screw thread extending helically along the outer surface and terminating on an end portion of the extruder screw, at least the end portion of the extruder screw being disposed in the first portion of the bore of the housing so as to define a first annular space between the outer surface of the extruder screw and an inner surface of the bore, the screw thread cooperating with the first portion of the bore such that rotation of the extruder screw advances a first melt stream of polymer material in a generally helical fashion along the first annular space;
    a shearing rod connected to the extruder screw such that the shearing rod is rotated by rotation of the extruder screw, the shearing rod extending into the second portion of the bore so as to define a second annular space between an outer surface of the shearing rod and an inner surface of the second portion, the second annular space being connected to the first annular space for receiving the first melt stream therefrom; and the housing defining a plurality of circumferentially spaced, generally radial passages extending through the housing and each having an opening at the inner surface of the second portion of the bore for feeding a plurality of second melt streams of polymer material into the second annular space to join with the first melt stream therein, the shearing rod rotating with the extruder screw such that the first and second melt streams are swirled together by the shearing rod as the streams advance along the second annular space, thereby creating a multiplicity of layers of the polymer materials.

2. The apparatus of claim 1, wherein the passage for the second melt stream comprises at least three passages spaced circumferentially about the second annular space.

3. The apparatus of claim 1, wherein the shearing rod has a free end located within the second portion of the bore of the housing and an end part of the bore extends beyond the free end of the shearing rod, the polymer materials filling the end part of the bore and being discharged from the end part as a non-hollow cylindrical melt stream for delivery to a subsequent article-forming device.

4. The apparatus of claim 1, wherein the free end of the shearing rod extends to an end of the second portion of the bore from which the polymer materials are discharged from the apparatus, such that the polymer materials are discharged as a tubular melt stream for delivery to a subsequent article-forming device.

5. The apparatus of claim 1, wherein the second portion of the bore has a smaller diameter than the first portion, and the bore includes a tapering portion connecting the first portion to the second portion.

6. The apparatus of claim 1, wherein the housing and shearing rod are configured such that a flow area of the second annular space decreases along the extrusion direction to a minimum flow area and then increases again with further distance along the extrusion direction.

7. The apparatus of claim 6, wherein the passage for feeding the second melt stream into the second annular space is positioned such that the second melt stream enters the second annular space substantially where the flow area of the second annular space is said minimum flow area.

8. An apparatus for extruding a multilayered structure, comprising:

a housing defining a bore extending along an axis through the housing, the bore having a first portion positioned upstream with respect to an extrusion direction and a second portion positioned downstream of the first portion with respect to the extrusion direction;

an extruder screw comprising an outer surface and having a screw thread extending helically along the outer surface and terminating on an end portion of the extruder screw, at least the end portion of the extruder screw being disposed in the first portion of the bore of the housing so as to define a first annular space between the outer surface of the extruder screw and an inner surface of the bore, the screw thread cooperating with the first portion of the bore such that rotation of the extruder screw advances a first melt stream of polymer material in a generally helical fashion along the first annular space;

a shearing rod connected to the extruder screw such that the shearing rod is rotated by rotation of the extruder screw, the shearing rod extending into the second portion of the bore so as to define a second annular space between an outer surface of the shearing rod and an inner surface of the second portion, the second annular space being connected to the first annular space for receiving the first melt stream therefrom; and the housing defining a passage extending through the housing and having an opening at the inner surface of the second portion of the bore for feeding a second melt stream of polymer material into the second annular space to join with the first melt stream therein, the shearing rod rotating with the extruder screw such that the first and second melt streams are swirled together by the shearing rod as the streams advance alone the second annular space, thereby creating a multiplicity of layers of the polymer materials;

wherein the bore is configured to divide the first melt stream into a plurality of circumferentially spaced first melt streams.

9. The apparatus of claim 8, wherein the passage for the second melt stream comprises a plurality of generally radial passages spaced circumferentially about the second annular space and each having an opening in the inner surface of the second portion of the bore for feeding a plurality of second melt streams into the second annular space in alternating arrangement with the first melt streams.

10. An apparatus for extruding a multilayered structure, comprising:

a housing defining a bore extending along an axis through the housing, the bore extending in an extrusion direction and terminating at a discharge opening at an outer face of the housing through which a fluid polymer stream is discharged for delivery to a subsequent article-forming device;

a shearing rod disposed coaxially in the bore so as to define an annular space between an outer surface of the shearing rod and an inner surface of the bore, the shearing rod being rotatable about an axis of the shearing rod; and the housing defining a plurality of generally radial passages spaced circumferentially about the annular space and extending through the housing into the annular space for feeding a plurality of first melt streams of polymer material into the annular space, the housing further defining a second passage extending through the housing and having an opening at the inner surface of the bore for feeding a second melt stream of polymer material into the annular space to join with the first melt streams therein;

rotation of the shearing rod causing the first and second melt streams to be swirled together by the shearing rod as the streams advance along the annular space, thereby creating a multiplicity of layers of the polymer materials, the shearing rod having a free end located within the bore of the housing, and an end part of the bore extending beyond the free end of the shearing rod to the discharge opening, the polymer materials filling the end part of the bore to form a non-hollow cylindrical melt stream therein, the non-hollow cylindrical melt stream being discharged from the discharge opening for delivery to a subsequent article-forming device.

11. An apparatus for extruding a multilayered structure, comprising:

a housing defining a bore extending along an axis through the housing, the bore extending in an extrusion direction and terminating at a discharge opening at an outer face of the housing through which a fluid polymer stream is discharged for delivery to a subsequent article-forming device;

a shearing rod disposed coaxially in the bore so as to define an annular space between an outer surface of the shearing rod and an inner surface of the bore, the shearing rod being rotatable about an axis of the shearing rod; and the housing defining a first passage extending through the housing into the annular space for feeding a first melt stream of polymer material into the annular space, the housing further defining a plurality of generally radial passages spaced circumferentially about the annular space and each having an opening in the inner surface of the bore for feeding a plurality of second melt streams into the annular space to join with the first melt stream therein;

rotation of the shearing rod causing the first and second melt streams to be swirled together by the shearing rod as the streams advance along the annular space, thereby creating a multiplicity of layers of the polymer materials, the shearing rod having a free end located within the bore of the housing, and an end part of the bore extending beyond the free end of the shearing rod to the discharge opening, the polymer materials filling the end part of the bore to form a non-hollow cylindrical melt stream therein, the non-hollow cylindrical melt stream being discharged from the discharge opening for delivery to a subsequent article-forming device.

12. The apparatus of claim 11, wherein the passage for the first melt stream is configured to divide the first melt stream into a plurality of circumferentially spaced first melt streams in alternating arrangement with the second melt streams.

13. The apparatus of claim 10, wherein the housing and shearing rod are configured such that a flow area of the annular space decreases along the extrusion direction to a minimum flow area and then increases again with further distance along the extrusion direction.

14. The apparatus of claim 13, wherein the passage for feeding one of the first and second melt streams into the annular space is positioned such that said one of the melt streams enters the annular space substantially where the flow area of the annular space is said minimum flow area.

15. A method for extruding a multilayered structure, comprising the steps of:

feeding a first melt stream of polymer material into a first annular space between an extruder screw and a bore of a housing and rotating the extruder screw to advance the first melt stream along the first annular space, the bore continuing beyond an end of the extruder screw;

providing a shearing rod connected to the end of the extruder screw, the shearing rod being coaxial with the extruder screw and bore and being rotated in the bore by rotation of the extruder screw, a second annular space being defined between the shearing rod and an inner surface of the bore;

feeding a plurality of second melt streams of polymer material generally radially inwardly through respective openings in the inner surface of the bore into the second annular space to join with the first melt stream therein, and rotating the shearing rod with the extruder screw such that the first and second melt streams are swirled together by the shearing rod as the streams advance along the second annular space, thereby creating a multiplicity of layers of the polymer materials.

16. The method of claim 15, wherein the shearing rod has a free end located within the bore of the housing and an end part of the bore extends beyond the free end of the shearing rod and terminates at a discharge opening at an outer face of the housing, and further comprising the step of advancing the polymer materials from the second annular space into the end part of the bore such that the polymer materials fill the end part and are discharged from the discharge opening as a non-hollow cylindrical melt stream for delivery to a subsequent article-forming device.

17. The method of claim 15, wherein the shearing rod extends to an outer face of the housing at which the bore terminates such that the bore and shearing rod define an annular discharge opening at the outer face, the polymer materials being discharged from the discharge opening as a tubular melt stream for delivery to a subsequent article-forming device.

18. A method for extruding a multilayered structure, comprising the steps of:

feeding a first melt stream of polymer material into an annular space between a rotatable shearing rod and an inner surface of a bore of a housing such that the polymer material is advanced along the annular space in an extrusion direction, the bore having an end part that continues in the extrusion direction beyond a free end of the shearing rod, wherein the bore is configured to divide the first melt stream into a plurality of circumferentially spaced first melt streams;

feeding a second melt stream of polymer material through an opening in the inner surface of the bore into the annular space to join with the first melt streams therein, and rotating the shearing rod relative to the housing to shear the polymer materials contained in the annular space such that the first and second melt streams are swirled together by the shearing rod as the streams advance along the annular space, thereby creating a multiplicity of layers of the polymer materials; and advancing the polymer materials from the annular space into the end part of the bore such that the polymer materials fill the end part to form a non-hollow cylindrical melt stream, and discharging the non-hollow cylindrical melt stream from the end part of the bore for delivery to a subsequent article-forming device.

* * * * *

UNITED STATES PATENT AND TRADEMARK OFFICE
CERTIFICATE OF CORRECTION

| | | |
|---|---|---|
| PATENT NO. | : 7,357,890 B2 | Page 1 of 1 |
| APPLICATION NO. | : 11/252381 | |
| DATED | : April 15, 2008 | |
| INVENTOR(S) | : Pritchett et al. | |

It is certified that error appears in the above-identified patent and that said Letters Patent is hereby corrected as shown below:

<u>Column 10,</u>

Line 14, "alone" should read --along--.

Signed and Sealed this

Fifth Day of August, 2008

JON W. DUDAS
*Director of the United States Patent and Trademark Office*